United States Patent

[11] 3,542,097

| [72] | Inventors | Edmund C. Dudek<br>Oakbrook, Illinois;<br>Richard M. Fegan, Taylors, South Carolina |
|---|---|---|
| [21] | Appl. No. | 726,075 |
| [22] | Filed | May 2, 1968 |
| [45] | Patented | Nov. 24, 1970 |
| [73] | Assignee | The Singer Company<br>New York, New York<br>a corporation of New Jersey |

[54] CHUCK ASSEMBLY FOR SABRE SAWS
5 Claims, 6 Drawing Figs.

[52] U.S. Cl. ............................................. 143/156
[51] Int. Cl. ........................................ B27b 11/06
[50] Field of Search ................................... 143/156,
68-1; 145/108, 35-1; 279/Inq; 30/Inq

[56] References Cited
UNITED STATES PATENTS

| 2,547,922 | 4/1951 | Bechtold | 143/68(-6) |
| 2,621,689 | 12/1952 | Fordon | 145/108(-6) |
| 2,747,631 | 5/1956 | Behlefeldt | 145/108(-6) |
| 3,028,889 | 4/1962 | McCarty | 143/68(-5) |
| 3,260,290 | 7/1966 | Happe et al. | 143/156X |

FOREIGN PATENTS

| 632,195 | 7/1936 | Germany | 143/156 |

Primary Examiner—Donald R. Schran
Attorneys—Marshall J. Breen and Chester A. Williams, Jr.

ABSTRACT: This disclosure relates to a chuck assembly for sabre saws in which the saw blade may be mounted in one of a plurality of cant angles by an operator-adjustable selector socket means prior to insertion of the blade, after which the blade is locked in the selected position by a locking means.

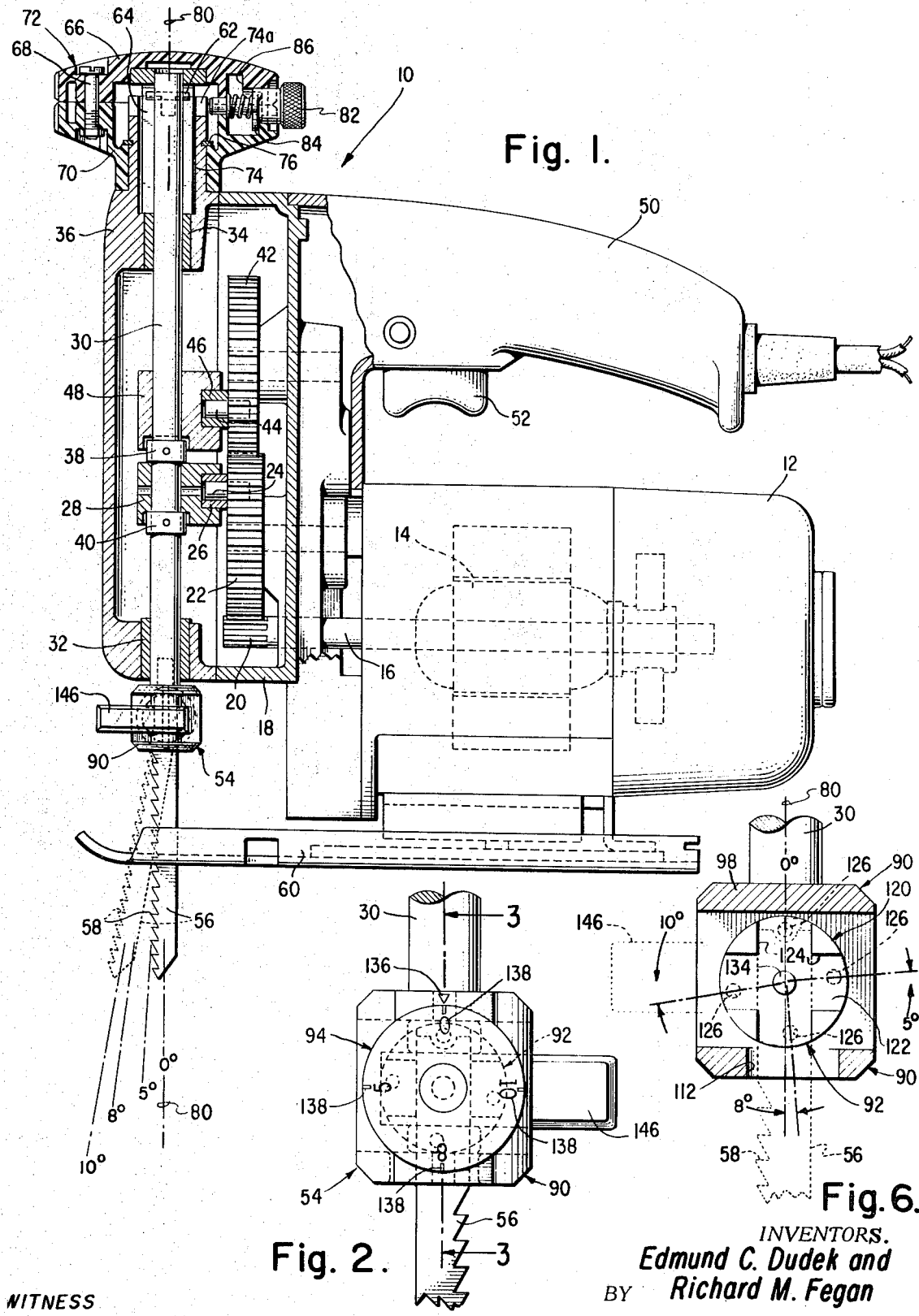

Patented Nov. 24, 1970

INVENTORS.
Edmund C. Dudek and
BY Richard M. Fegan

WITNESS
Nicholas Leszczak

Marshall J. Breen
ATTORNEY

CHUCK ASSEMBLY FOR SABRE SAWS

BACKGROUND OF THE INVENTION

The term "cant" in this application shall be used with reference to the saw blade and the mounting thereof in the chuck assembly to describe an angle of inclination of said saw blade relative to the axis of the saw bar.

Since the chuck assembly provides for adjustably positioning the cant angle in a plurality of positions, the vertical mounting of the saw blades, or in other words the saw blade position corresponding to an angle of 0° cant, is also included in the general definition, along with the other positions at the various preferred angles indicated.

The prior art recognized that upon the saw blade being canted with respect to the axis of the saw bar, the desired results of increasing the speed of cutting and the range of materials to be cut could be obtained. However, the prior art approach was restricted and limited, in that, special blades were required for conventional chucks or, vice versa. In any event, to mount the saw blade for vertical cuts and canted cuts, on the one hand, a plurality of chucks were required, or on the other hand, a plurality of blades were required. Either situation left much to be desired.

SUMMARY OF THE INVENTION

In accordance with the present invention, the novel chuck assembly is connected to a reciprocating saw bar of a sabre saw, and adapted to carry a saw blade in one of a plurality of operator adjustable positions. The chuck assembly includes a head, a selector socket means and blade locking means. The head is connected to the saw bar and has the selector socket means disposed therein. The selector socket means has a plurality of blade-carrying positions adapted to position the saw blade at one of a plurality of predetermined cant angles. After setting the cant angle for the selector socket means, the blade is inserted and the blade-locking means is actuated to lock the blade in the selected position.

It is therefore an object of the present invention, to provide an improved chuck assembly for sabre saws which overcomes the prior art deficiencies; which is simple, economical, and reliable; which is adjustable to enable the blade to be set at an angle of zero cant, or at other predetermined angles of cant; which uses a yieldable held selector socket means having a plurality of blade-carrying positions; which uses a cam blade-locking means; and which is operator adjusted to one of a plurality of saw blade mounting positions capable of successively increasing the cant angle of the saw blade.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which:

FIG. 1 is a longitudinal elevational view, partly in section, of a sabre saw illustrating the present invention;

FIG. 2 is a view taken along line 2-2 of FIG. 3 showing a side elevation of the chuck assembly on the reverse side of that of FIG. 1;

FIG. 6 is an elevational view partly in section, taken along line 6-6 of FIG. 4.

DESCRIPTION OF THE INVENTION

Figure 3:
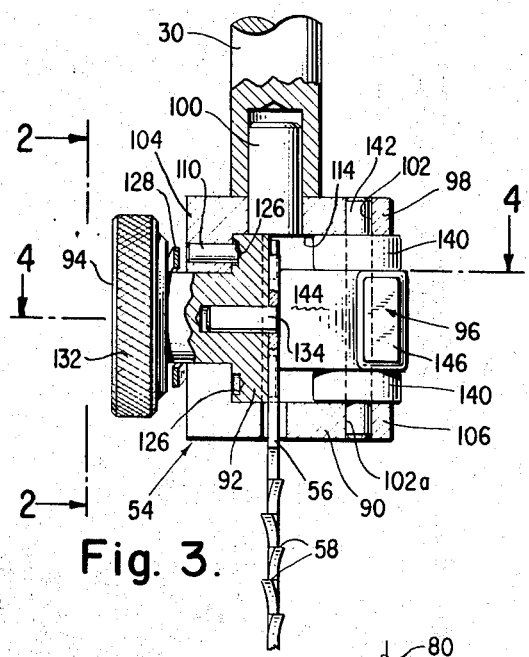
FIG. 3 is an elevational view, partly in section, taken along line 3-3 of FIG. 2.

A conventional sabre saw is illustrated in FIG. 1 embodying the present invention. The sabre saw 10 has a motor housing 12 in which is mounted a driving electric motor 14 having a shaft 16, one end of which extends into a gear housing 18 and is formed with a splined portion 20. A gear 22 is journaled in the gear housing to mesh with and be driven by the splined portion 20. The gear 22 carries an eccentric pin 24 surmounted by a roller 26 which engages a slide portion of a crosshead 28.

A saw bar 30 journaled for linear endwise movement in bearings 32 and 34 secured in a gear housing cover 36, is free to turn about its own longitudinal axis with respect to the crosshead 28. However, collars 38 and 40, secured to the saw bar 30 by any suitable means, are positioned on axially opposite sides of and close to the crosshead 28 and serve to transmit linear reciprocatory motion from the crosshead 28 and to the saw bar 30.

A gear 42 journaled in the gear housing 18 meshes with gear 22 and by means of eccentric pin 44 and roller 46 drives an upper balancing crosshead 48 which is free to turn and slide on the saw bar 30.

A handle 50 is connected to the housings 12 and 18 and carries a switch 52 therein, the actuation of which operates the motor 14 to drive the gear 22 so that the pin 24 and roller 26 transmitting motion through the crosshead 28 cause the saw bar 30 to reciprocate along a linear axial path. The lower end of the saw bar 30 has affixed thereto an improved chuck assembly 54 which carries a saw blade 56 having a cutting edge 58 which is driven by linear reciprocatory path of the saw bar 30, which path is substantially normal to the plane of a work-contacting shoe or platform 60.

The upper end of the saw bar 30 carries a pin 62 that freely slides within a slotted sleeve 64 fixedly connected in the upper portion 66 of a control means for swiveling the saw bar 30. A screw and nut 68 fasten the lower portion 70 to the upper portion 66 to form a single operator-actuated knob or control means 72 rotatably held on a hub extension 74 of the housing cover 36 by a split snap ring 76. In the positions shown the control means 72 may be freely rotated so as to rotate the saw bar 30 about its axis, designated generally as 80. The hub extension 74 has a notched upper end as at 74a into which a normally outwardly biased control pin 82 may be disposed upon the operator pushing the free end of the pin into the notch 74a and rotating the pin 82 180° so as to place an integral cam 84 of the pin in engagement with a shoulder 86 formed in the upper portion 66 whereby the free end of the pin will be locked within said notch. In this manner the saw bar 30 and the blade 56 carried at the lower end thereof may be placed in any one of a plurality of different angularly oblique positions relative to the line of movement of the tool. A more detailed description of the rotatable control of the saw bar 30 may be had by referring to U.S. Pat. No. 3,494,390 entitled "Sabre Saw with 360° Swivel Saw Bar", granted to Edmund C. Dudek, Feb. 10, 1970.

In order to extend the versatility of the sabre saw 10, the improved chuck assembly 54 has been provided, especially for affecting the speed of cutting and the range of materials adapted to be cut. The novel chuck assembly 54 may be used on any conventional power saw, whether it be a sabre saw, a reciprocating saw, a jig saw or the like.

In FIG. 1 the blade 56 is shown in the full line vertical position at a 0° angle of cant, in which position the longitudinal axis of the blade will lie parallel to the axis 80 of the saw bar 30. In the phantom representation of the blade 56 the angle of cant lies at an angle of 10°. Random intermediate angles of 5° and 8° are also indicated, but it will be understood that the saw blade angle of cant could have had an increased maximum angle of cant or decreased intermediate angles of cant within the scope of the present invention.

When the saw blade 56 is positioned in the improved chuck assembly 54 at a 0° angle of cant the saw 10 will operate more accurately but cut at a somewhat slower rate than when the cant angle of the saw blade is increased. However, the accuracy of the cut is reduced as the cant angle is increased.

Figure 5:
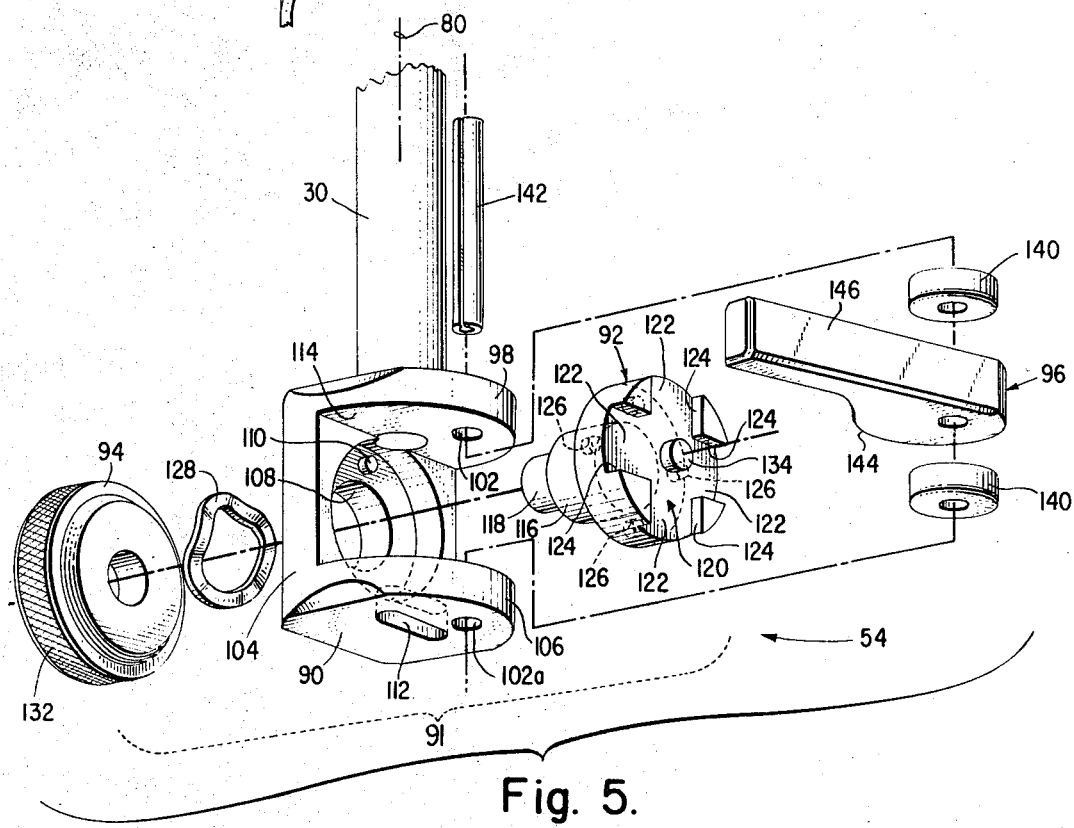
FIG. 5 is an exploded perspective view of the improved chuck assembly.

The chuck assembly 54, illustrated in FIG. 5 includes a head 90, a selector socket unit or blade socket means 91 which has a socket member 92 connected to a selector member 94, and a blade-locking device 96.

The head 90, shown in FIGS. 3 and 5, has an upper flange 98 which connects the head 90 to the saw bar 30 by a pin 100. The flange 98 has an aperture 102 formed on the side adjacent the rounded end, and carries a base member 104 disposed parallel to the saw bar 30 on the opposite side. A second flange 106 extends from the lower end of a base member 104, which flange is shaped similar to the flange 98 and has an aperture 102a in alignment with the aperture 102. The base member 104 has a countersunk central aperture 108 the countersunk portion of which extends from flange to flange. A detent pin 110 is connected in the upper portion of the countersunk aperture 108 along a hypothetical vertical line to extend into said aperture a short distance. An elongated blade slot 112 is formed in the lower flange 106 to permit a blade to extend upwardly therethrough with sufficient clearance to permit adjustment of the cant angle of the blade. The head 90 is integrally formed and defines a recess 114 bounded by the base member 104 and the flanges 98 and 106.

Figure 4:
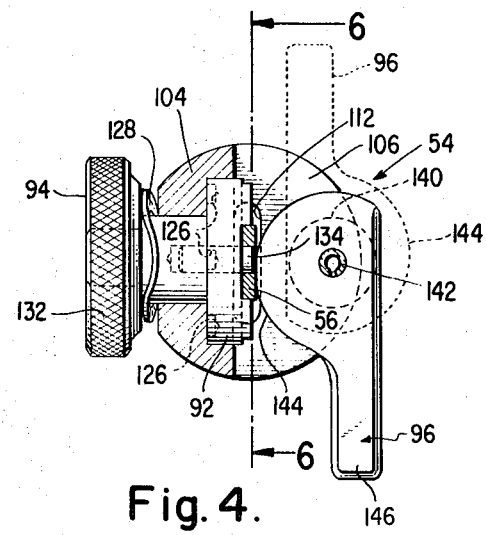
FIG. 4 is a plan view, partly in section, taken along line 4-4 of FIG. 3.

The socket member 92 of the selector socket unit 91 is shown in FIGS. 3, 4 and 5 to include a hub 116 that carries a stub shaft 118 on one side thereof and a disc 120 on the other side thereof. The front face of the disc has perpendicular slots 122 formed by milled cuts. The four slots 112 are formed as wide as the width of the shank of the blade 56, the width being defined by a pair of facing shoulders 124. The rear face of the disc 120 has four blind holes 126, best shown in FIG. 6, each formed at a predetermined angle to the 90° quadrant lines which lie parallel to the slots 122. The blind holes 126 are formed on a circumference of a circle having a radius measured from a point aligned to the center of the aperture 108. The radius is set at a distance equal to the distance which the detent pin 110 is spaced from the center of the aperture 108, so that the blind holes 126 will be rotated about a line which coincides with the detent pin 110 to permit said pin to mate with a blind hole 126 at the selected cant angle. FIG. 6 indicates one set of preferred cant angles to increase in a clockwise direction in the order of 0°, 5°, 8° and 10°. In each case upon the blind hole 126 being positioned, as explained hereinafter, opposite to the detent pin 110, it will set the diagonally opposite slot 122 at the selected angle of cant thereby enabling the blade 56 to be mounted at said angle.

The socket member 92 is inserted, shaft 118 first, into the recess 114 of the head 90 whereby the hub 116 will journal in the aperture 108 and the disc 120 will seat within the counterbore thereof. The hub will extend slightly outwardly from the base member 104 and have a bowed spring washer 128 disposed thereabout between the base member 104 and the selector member or knob 94. The selector member 94 is fixedly connected to the stub shaft 118, thus holding the socket member 92 captive in the head 90, and forming the selector socket unit 91 therewith.

The axial distance measured along the hub 116 occupied by spring washer 128 is slightly greater than the axial distance which the detent pin 110 extends into the counterbore of the aperture 108. Normally, the spring washer 128 will urge the disc 120 to seat in the counterbore of the aperture 108, with one of the blind holes 126 aligned with the detent pin 110 to permit said pin to extend in said hole. In this manner, the pin serves to lock the socket member 92 in one of the plurality of adjustable cant positions shown in FIG. 1. In order to change the position of the socket member, the operator will grasp the diamond knurled outer surface 132 of the selector knob 94 and press said knob in the direction of the recess 114 to remove the detent pin 110 from the detent hole 126, and thereafter rotate the selector socket unit 91 to the desired position in which the detent pin 110 will be seated in the appropriate blind holes 126. The spring washer 128 which was compressed during the rotation of the selector socket unit 91 will, on release of the selector knob 94, again urge the selector knob 130 outwardly and away from the recess 114 to lock the detent pin 110 in the blind holes 126 corresponding to the selected angle of cant for the blade 56.

Though the milled cuts 122 could be made corresponding to the desired angle of cant and the blind hole 126 placed on the 90° quadrant lines it is preferred to use the construction best shown in FIG. 6, to obtain the same result in a far easier and less costly manner.

The disc 120 carries a blade positioning pin 134 disposed in an aperture, the axis of which is coincident to the axis of the hub 116 and the stub shaft 118 and which in assembled position also corresponds to the center of the aperture 108.

In other words the center of the pin 134 serves to define the axial line of the selector-socket unit 91, which axial line is perpendicularly intersected by the axis 80 of the saw bar 30. The shank of the blade 56 has an aperture which seats upon the pin 134 when the blade 56 as shown in FIGS. 3 and 4 is inserted upwardly through the slot 112 and into the lowest vertical slot 122. The central location of the pin 134 permits it to serve all four slots 122 regardless of cant angle. Accordingly, the cant angle of the blades may be successively increased as shown in FIG. 1 through the angles of 0°, 5°, 8°, and 10° upon operator adjustment of the selector-socket unit 91 of the chuck assembly 54.

However to facilitate operator adjustment of the selector socket unit 91 has an indexing mark 136 formed on the base member 104 to which it is registered as illustrated in FIG. 2 at a circumferential angle mark 138 corresponding to the cant angle settings of 0°, 5°, 8°, and 10°. Of course the angle marks 138 are coordinated with the blind holes 126 in order to set the chuck assembly 54 at the indicated angle of cant.

Subsequent to the selector knob 130 being set at the desired angle of cant and the blade 56 inserted through the blade slot 112 and positioned within the lower vertical slot 122 to seat upon the pin 134, a blade-locking device 96 will be actuated to lock the blade in place. It will be understood that the blade-locking device, 96, may be of any conventional type, suitable to hold the blade in mounted position, and that the cam type is shown merely for illustrative purposes.

Positioned in the recess 114 of the head 90 is a locking device 96 sandwiched between spacer washers 140, which in turn are placed between the flanges 98 and 106 in alignment with the apertures 102 and 102a therein. A spirol or slotted pin 142 extends through said flanges and washers to rotatably hold the locking device 96 in place within the head 90. The locking device 96 includes a cam portion 144 which extends from a flat side of the device 96 and terminates in a handle portion 146 that extends outwardly from the cam and includes the flat side. As best seen in FIG. 4 the locking device 96 may assume an open or a closed position; and the open position is shown dotted and provides clearance for adjustment of the selector socket unit prior to insertion of the blade, while the closed position is shown full line with the cam portion 144 locked against the shank of the blade 56.

The blade may be any conventional-type blade 56, which usually has a straight longitudinal axis. In fact, the cant angle marks 138 on the selector knob 130 have been determined on the use of a straight blade, but in the event that another type of blade is to be used the settings could be suitably changed.

In summary, the operator adjusts the selector socket unit 91 to a desired cant angle and then inserts the blade into the blade slot 112 to seat the aperture in the shank of the blade upon the positioning pin 134, as illustrated in FIGS. 3 and 4. The blade-locking device 96 will then be turned from the dotted position shown in FIG. 4 to the straight position line thereof, in which the cam portion 144 engages the shank of the blade 56 to hold it upon the positioning pin 134 in addition to frictionally locking it in place in the chuck assembly 54. If the operator desires to change the cant angle of the blade 56 he merely releases the blade-locking device 96, removes the blade and rotates the selector socket unit 91 to the desired cant angle, after which the blade is reinserted and the locking device 96 turned to the locked position.

Certain common angles of cant adjustment have been indicated in FIGS. 2 and 6, but of course, these angles are only for purposes of illustration and may be set as desired by the mere facility of locating the blind holes 126 at the desired angle with respect to the 90° quadrant lines.

It will be understood that various changes in the details, materials, arrangements of parts, and operating conditions which have been herein described and illustrated in order to explain the nature of the invention may be made by those skilled in the art within the principles and scope of the invention as expressed in the claims.

We claim:

1. A chuck assembly adapted to be connected to a reciprocating saw bar of a sabre saw, and adapted to carry a saw blade comprising:
   a. a head connected to a saw bar and having a recess formed therein;
   b. a selector socket means connected to the head including a rotatable disc having a plurality of slots formed therein and a portion of said rotatable disc extending outwardly of the head;
   c. selector knob means fixedly connected to the outward portion of said disc adapted to be operator-rotated to a predetermined position in order to place one of the slots at a predetermined angle;
   d. means on the head and disc for interlocking the head and the disc in said predetermined position;
   e. a spring means biasing the selector knob means to yieldably hold the rotatable disc in engagement with the disc-locking means of the head in a releasable manner to permit operator-actuated shifting of the socket disc means to another position; and
   f. a blade-locking means connected to the head to lock the blade in said socket means at the selected predetermined angle.

2. The combination claimed in claim 1 wherein:
   a. the head has an aperture in communication with the recess therein; and
   b. the portion of the socket disc means extending outwardly of the head defines a shaft which extends through the aperture, the selector knob fixedly connected to the shaft outwardly of the head whereby the socket disc means is adapted to be rotated by the operator.

3. The combination claimed in claim 1 wherein:
   a. the locking means on the head and the rotatable disc includes at least one pin on one of the members, and at least one blind hole on the other member selectively to lock the rotatable disc relative to the head; and
   b. the locking means is interconnected at a selected angle to the longitudinal axis of the slots carrying the saw blade, which angle is within the range of from 0° to 10°, to enable the saw blade to be set at the desired angle of cant.

4. A power-operated portable saw carrying a blade comprising:
   a. a housing;
   b. driving means mounted in the housing;
   c. a saw bar journaled in the housing with one end extending therefrom, and adapted to be reciprocated along a linear axis by the driving means;
   d. a chuck assembly means connected to the free end of the saw bar and including a blade socket means and a blade-locking means;
   e. the blade socket means including a rotatable member having a plurality of slots positionable at successively increased angles of cant to change the angular relationship of the axis of the blade relative to the axis of the saw bar; and
   f. the blade-locking means operated to lock the blade at the selected cant angle.

5. The combination claimed in claim 4 wherein the blade-socket means has four blade-carrying slots formed therein at successively increased angles of cant whereby said blade socket means may be operator adjusted to one of the four predetermined cant angle positions prior to the blade being inserted and locked in the chuck assembly.